US010730481B2

(12) United States Patent
Burgkhardt et al.

(10) Patent No.: US 10,730,481 B2
(45) Date of Patent: Aug. 4, 2020

(54) REMOTE CONTROL OF VEHICLE FUNCTIONALITIES BY MEANS OF A MOBILE TERMINAL

(71) Applicant: Bayerische Motoren Werke Aktiengesellschaft, Munich (DE)

(72) Inventors: Dennis Burgkhardt, Munich (DE); Hyung-Taek Lim, Munich (DE); Thomas Krauss, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 373 days.

(21) Appl. No.: 15/609,590

(22) Filed: May 31, 2017

(65) Prior Publication Data

US 2017/0259786 A1 Sep. 14, 2017

Related U.S. Application Data

(63) Continuation of application No. PCT/EP2015/076143, filed on Nov. 10, 2015.

(30) Foreign Application Priority Data

Dec. 1, 2014 (DE) .................. 10 2014 224 481

(51) Int. Cl.
*B60R 25/24* (2013.01)
*B60R 25/04* (2013.01)
(Continued)

(52) U.S. Cl.
CPC ............ *B60R 25/241* (2013.01); *B60R 25/01* (2013.01); *B60R 25/04* (2013.01); *B60R 25/104* (2013.01);
(Continued)

(58) Field of Classification Search
CPC ....... B60R 25/241; B60R 25/01; B60R 25/04; B60R 215/104; B60R 25/2018;
(Continued)

(56) References Cited

U.S. PATENT DOCUMENTS 6,728,531 B1 * 4/2004 Lee .................. G01C 21/34
455/414.1
6,988,034 B1   1/2006 Marlatt et al.
(Continued)

FOREIGN PATENT DOCUMENTS

CN       1768189 A   5/2006
CN     103204134 A   7/2013
(Continued)

OTHER PUBLICATIONS

International Search Report (PCT/ISA/210) issued in PCT Application No. PCT/EP2015/076143 dated Feb. 16, 2016 with English translation (eight pages).
(Continued)

*Primary Examiner* — Tuan C To
(74) *Attorney, Agent, or Firm* — Crowell & Moring LLP

(57) ABSTRACT

A system and method for remote control of functionalities of a vehicle, for example a motor vehicle reserved for hire, is provided. The system and method include transmission and receipt of information between a mobile terminal, a remote vehicle management system and a control unit of a vehicle to remotely control, particularly to remotely initiate, particular functionalities of a vehicle which has been selected, particularly reserved, in advance using the vehicle management system. The mobile terminal is identified to the vehicle on the basis of an interchange of identifiers that the vehicle and the terminal have received in advance from the vehicle management system.

15 Claims, 3 Drawing Sheets

(51) Int. Cl.

| | | |
|---|---|---|
| *H04W 12/02* | (2009.01) | |
| *B60R 25/104* | (2013.01) | |
| *B60R 25/01* | (2013.01) | |
| *B60R 25/20* | (2013.01) | |
| *H04W 4/40* | (2018.01) | |
| *H04W 4/029* | (2018.01) | |
| *H04W 12/06* | (2009.01) | |
| *H04L 29/06* | (2006.01) | |
| *G06Q 10/02* | (2012.01) | |
| *G06Q 30/06* | (2012.01) | |
| *G06Q 50/30* | (2012.01) | |
| *H04W 88/02* | (2009.01) | |

(52) U.S. Cl.
CPC ........ *B60R 25/209* (2013.01); *B60R 25/2018* (2013.01); *G06Q 10/02* (2013.01); *G06Q 30/0645* (2013.01); *G06Q 50/30* (2013.01); *H04L 63/0435* (2013.01); *H04W 4/029* (2018.02); *H04W 4/40* (2018.02); *H04W 12/02* (2013.01); *H04W 12/06* (2013.01); *B60R 2325/20* (2013.01); *H04L 2209/80* (2013.01); *H04W 88/02* (2013.01)

(58) Field of Classification Search
CPC .. B60R 25/209; B60R 2325/20; G06Q 10/02; G06Q 30/0645; G06Q 50/30; H04L 63/0435; H04L 2209/80; H04W 4/046; H04W 12/02; H04W 12/06; H04W 88/02
USPC ............................................................ 701/2
See application file for complete search history.

(56) References Cited

U.S. PATENT DOCUMENTS

| | | | | |
|---|---|---|---|---|
| 7,126,464 | B2* | 10/2006 | Harvey | B60P 3/227 340/471 |
| 8,660,709 | B2* | 2/2014 | Harvey | B60R 25/1003 340/425.5 |
| 9,299,053 | B2* | 3/2016 | Gazdzinski | G06Q 10/08 |
| 9,573,482 | B2* | 2/2017 | Ishibashi | B60L 53/68 |
| 10,121,204 | B1* | 11/2018 | Brandmaier | G06Q 40/08 |
| 2001/0037174 | A1 | 11/2001 | Dickerson | |
| 2003/0233189 | A1* | 12/2003 | Hsiao | G01C 21/26 701/521 |
| 2004/0073440 | A1 | 4/2004 | Garbers et al. | |
| 2006/0192650 | A1 | 8/2006 | Shinada | |
| 2008/0214165 | A1 | 9/2008 | Matsumura et al. | |
| 2010/0208707 | A1* | 8/2010 | Hamabe | H04W 36/30 370/332 |
| 2012/0011058 | A1 | 1/2012 | Pitroda et al. | |
| 2012/0123611 | A1* | 5/2012 | Grasso | B60R 25/00 701/1 |
| 2012/0129517 | A1* | 5/2012 | Fox | H04W 12/12 455/425 |
| 2012/0225634 | A1* | 9/2012 | Gee | H04L 67/306 455/404.2 |
| 2012/0253607 | A1 | 10/2012 | Choi | |
| 2013/0073349 | A1 | 3/2013 | Kolling | |
| 2013/0091452 | A1* | 4/2013 | Sorden | G01C 21/32 715/771 |
| 2013/0124009 | A1* | 5/2013 | Esler | H04L 67/125 701/2 |
| 2013/0133048 | A1* | 5/2013 | Wyn-Harris | H04L 63/102 726/5 |
| 2013/0179005 | A1 | 7/2013 | Nishimoto et al. | |
| 2013/0294293 | A1* | 11/2013 | Iwai | H04W 76/22 370/259 |
| 2013/0325521 | A1 | 12/2013 | Jameel et al. | |
| 2013/0338883 | A1* | 12/2013 | Savoure | H04L 9/3234 701/49 |
| 2014/0129053 | A1 | 5/2014 | Kleve et al. | |
| 2014/0162623 | A1* | 6/2014 | Nagai | G08G 1/168 455/419 |
| 2014/0200034 | A1* | 7/2014 | Lee | H04W 64/00 455/456.3 |
| 2014/0213238 | A1* | 7/2014 | Giraud | G07C 5/008 455/418 |
| 2014/0220951 | A1* | 8/2014 | Gumbrell | H04W 48/16 455/418 |
| 2014/0330453 | A1* | 11/2014 | Nakagawa | B60H 1/00428 701/2 |
| 2015/0229637 | A1* | 8/2015 | Sim | H04L 63/0823 726/10 |
| 2015/0242799 | A1* | 8/2015 | Seki | G06Q 10/06311 705/7.15 |
| 2015/0341749 | A1* | 11/2015 | Jodlauk | H04W 72/0446 455/414.2 |
| 2016/0119300 | A1* | 4/2016 | Studerus | H04W 12/0023 713/171 |
| 2016/0174106 | A1* | 6/2016 | Lee | H04W 40/20 705/14.63 |
| 2016/0337441 | A1* | 11/2016 | Bloomquist | G06F 9/5061 |

FOREIGN PATENT DOCUMENTS

| | | |
|---|---|---|
| CN | 103810629 A | 5/2014 |
| DE | 43 01 039 A1 | 7/1994 |
| DE | 101 37 579 A1 | 2/2003 |
| DE | 10 2014 217 504 A1 | 3/2016 |
| EP | 0 738 058 A2 | 10/1996 |
| JP | 2002-175588 A | 6/2002 |
| WO | WO 02/01508 A1 | 1/2002 |
| WO | WO 2010/144490 A1 | 6/2010 |

OTHER PUBLICATIONS

German-language Written Opinion (PCT/ISA/237) issued in PCT Application No. PCT/EP2015/076143 dated Feb. 16, 2016 (eight pages).

German Search Report issued in counterpart German Application No. 10 2014 224 481.1 dated Jun. 21, 2016 with partial English translation (14 pages).

English translation of Chinese-language Office Action issued in counterpart Chinese Application No. 201580057909.3 dated Oct. 8, 2018 (eleven (11) pages).

* cited by examiner

REMOTE CONTROL OF VEHICLE FUNCTIONALITIES BY MEANS OF A MOBILE TERMINAL

CROSS REFERENCE TO RELATED APPLICATIONS

This application is a continuation of PCT International Application No. PCT/EP2015/076143, filed Nov. 10, 2015, which claims priority under 35 U.S.C. § 119 from German Patent Application No. 10 2014 224 481.1, filed Dec. 1, 2014, the entire disclosures of which are herein expressly incorporated by reference.

BACKGROUND AND SUMMARY OF THE INVENTION

The present invention relates to the remote control of functionalities of a vehicle, particularly of a motor vehicle, by a mobile terminal. In particular, the invention relates to a control system for a vehicle, to a vehicle itself having such a control system, to a vehicle management system, and also to a method for operating a mobile terminal and to a corresponding computer program. The mobile terminal can be used to remotely control, particularly to remotely trigger, using a mobile terminal, functionalities of a vehicle that are determined on said vehicle, which has previously been selected, particularly reserved, using the vehicle management system.

Information technology and telecommunications engineering today provides a multiplicity of different radio-based communication technologies by which data can be transmitted efficiently and at ever increasing data rates over various distances. In this context, such technologies are also being used increasingly in connection with modern vehicle engineering, particularly in the automotive sector.

Against this background, the prior art discloses solutions, for example, that involve a short-range, cryptographically encrypted radio link between a vehicle key and the vehicle being used to unlock the vehicle when the key is in proximity to the vehicle, particularly in this case in a particular position relative to the vehicle, without this requiring the key to be mechanically inserted into a vehicle lock (this is also referred to by the key word "Keyless Entry").

The iBeacon technology from Apple Inc., which is based on the Bluetooth® Low Energy standard (BT 4.0 or "BLE") or future follow-up generations therefor, provides an example of an inexpensive solution, which is also beneficial from the point of view of power consumption, to identifying items using a small radio chip (tagging) that regularly transmits information packets unidirectionally. By measuring the reception power on reception of such information packets on a suitable receiver, for example a mobile terminal, such as a smartphone, it is possible, besides simply being able to receive the information packet, to derive an at least coarse estimate of the distance between the transmitter (tag) and the receiver too. On this basis, the applicant is familiar, within the company, with a locating technology in which a vehicle key or another item to be located in the vehicle itself or in the environment thereof can be located using radio technology, with bidirectional communication being set up between the item to be located (key) and the vehicle. This locating technology, which allows zone-based location of items in the vehicle or in the environment thereof using Bluetooth® technology, is described particularly in the German patent application DE 10 2014 217 504.6, which is hereby included herein in its entirety by way of reference.

Moreover, in recent years, vehicle reservation solutions have increasingly been developed that allow a vehicle, for example a rental car, to be reserved via the internet. For this purpose, most of these systems require prior registration of a user making the reservation in order to establish a business relationship with the operator of the vehicle or of the vehicle reservation solution.

The international patent application WO 2010/144490 A1 describes a reservation solution of this kind in which a mobile communication device is used in order to send a radio signal to a receiver in a reserved vehicle, wherein the signal contains identification information that identifies the user of the terminal to the vehicle. The terminal has a display apparatus having input capability that the user can use to send a request to the vehicle to control a particular function of the vehicle.

Furthermore, the international patent application WO 02/01508 A1 discloses an automatic rental system for a vehicle fleet, which rental system is provided with a central automatic fleet management system. The latter can use data connections to communicate with local data processing systems that are installed in each vehicle of the fleet. Moreover, each of the vehicles has a configurable user interface provided on it for potential renters, said user interface being accessible from outside the vehicle, being connected to the local data processing system and being able to be used to rent the vehicle in conjunction with the fleet management system.

The American patent application US 2013/0325521 A1 describes a rental system for vehicles in which a computer system is provided in each vehicle for rent. This computer system can be used to receive identification information, originating from a central remote reservation computer system and containing an identity of a driver for the vehicle, and to unlock the respective vehicle if the identity of the driver can be confirmed. This can be done particularly on the basis of the identity of a portable computer device of the driver that communicates with the computer system of the vehicle via a radio link.

Against this background, the invention is based on the object of providing an even more improved solution to managing, particularly reserving, and subsequently controlling a correspondingly managed vehicle using a mobile terminal.

A first aspect of the invention relates to a control system for a vehicle, particularly a controller. The vehicle may particularly be a motor vehicle. The control system has a control unit, a first communication interface for the communication link to a remote vehicle management system, a second communication device for the communication link to a mobile terminal and at least one control interface for actuating one or more vehicle components for providing associated vehicle functionalities. In this case, the control unit is set up:

to use the first communication interface to obtain identification information from the vehicle management system;

to use the second communication interface to output a first identifier that the identification information contains;

to use the second communication interface to obtain a second identifier from a mobile terminal;

to check whether the second identifier corresponds to the first identifier according to a first predetermined rule; and if this is the case, to trigger or alter at least one predetermined vehicle functionality by actuating one or more vehicle components associated with the at least one vehicle functionality via the at least one control interface as appropriate.

A "vehicle" within the context of the invention is intended to be understood to mean any kind of vehicle that can be used to transport one or more persons and/or cargo. In particular, an automobile, a truck, a motorcycle, a bus, a bicycle or a trailer for one of the vehicles cited above is a vehicle within the context of the invention. This particularly also applies to the traction unit and the cars of a train, to a watercraft or an aircraft, particularly an airplane.

A "control system" within the context of the invention is intended to be understood to mean a system consisting of multiple components that is provided for integration into a vehicle, particularly a motor vehicle, and is set up to actuate one or more other vehicle components in terms of control or regulation using appropriate signals. In particular, a control system may be what is known as a controller of a vehicle.

A "control unit" within the context of the invention is intended to be understood to mean a component of a control system that is set up to obtain data and to evaluate said data, or to process them further, and particularly to take this as a basis for generating control signals for actuating other vehicle components. The control unit may particularly be formed by one or more processors on which one or more computer programs can run, the computer program(s) in turn being able to be stored in a memory. Instead of this or in addition, the control unit can particularly also contain "hard-wired" circuit logic.

A "communication link" within the context of the invention is intended to be understood to mean a communications connection for transmitting information, particularly data. In particular, a communication link can be provided by electrical signals, optical signals or wirelessly by radio signals, the information to be transmitted being impressed on the signals (signal modulation). The appropriate methods are well known to a person skilled in the art from communications engineering.

A "communication interface" within the context of the invention is intended to be understood to mean an apparatus of a technical entity, particularly of a control system, that can be used to provide a communication link to at least one other technical entity directly, or indirectly via at least one interposed communication device (for example a radio interface or a gateway). In particular, there may be a communication interface physically by virtue of a connecting apparatus to an electrically conductive or optical or wireless connection. Furthermore, the communication interface can have the capacity for data processing or conditioning that can be used to transmit data or other information in a predetermined manner at the transmitter end and to process said data or information at the receiver end. This can be accomplished particularly by what are known as communication protocols. As such, apparatuses for connecting a technical entity, particularly a controller, to bus systems (e.g. CAN, MOST, etc.) or other communication networks (e.g. Ethernet, mobile radio, WLAN, Bluetooth®) and in this case particularly to the Internet are also "communication interfaces" in the aforementioned sense, for example.

A "control interface" within the context of the invention is intended to be understood to mean a communication interface that is set up to send data for controlling or regulating other system components, particularly vehicle components, to said system components via an appropriate communication link and optionally also to receive data or other signals emanating from said system components. Where reference is made here to a first and a second communication interface, these may be embodied either separately or as a single joint interface, with different communication links being able to be provided by the same communication interface in the latter case. Similarly, when they are implemented, one or more control interfaces may be coincident among one another or with a communication interface at least in part.

A "mobile terminal" within the context of the invention is intended to be understood to mean a portable electronic device that has at least one communication device for setting up an in particular wireless communication link, and furthermore has a processor on which a computer program can run. In particular, modern cell phones, including what are known as "smartphones", and portable computers, particularly what are known as "tablet computers" or "smart watches", having the aforementioned functionality are "mobile terminals" within the context of the invention.

Within the context of the invention, "remote control" and "remote triggering" of vehicle functionalities by a mobile terminal are intended to be understood to mean, in particular, indirect control that involves the mobile terminal establishing a communication link to the control unit of the control system of the vehicle, which control unit subsequently actuates the at least one vehicle component governing the respective vehicle functionality.

An "identifier" within the context of the invention is intended to be understood to mean a piece of information, particularly a characteristic feature, symbol or a totality of characteristic features or symbols for explicitly identifying something. In particular, data and signals, for example characteristic bit sequences or modulated radio signals that can be used to identify a source or a transmitter of the or signals, are "identifiers" within the context of the invention. The check to determine whether the second identifier corresponds to the first identifier according to a first predetermined rule may particularly involve checking whether the two identifiers match or can be converted into one another according to a predetermined, in particular mathematical, operation or are correlated with one another according to a prescribed correlation specification, particularly such that an associated correlation coefficient is on the other side of a predetermined threshold. In a variant, it is also possible for the first and second identifiers, in analogy to the known cryptographic RSA method, to be a pair of keys corresponding to one another (private and public keys in the RSA analogy).

The control system according to the invention can be used to control or regulate one or more functionalities of a vehicle via a mobile terminal if previously both the control system in the vehicle and the terminal have obtained, particularly from a vehicle management system, appropriate identification information that allow the control system to identify the terminal. In this case, the communication between the control system and the mobile terminal can advantageously take place using a generally used radio technology without the need for a proprietary solution in order to ensure the requisite security of the data transmission. Furthermore, widely used conventional mobile terminals can be used without the need for specific terminals. It is therefore possible to use such devices in the possession of the user of the solution without the operator of a reservation system or of a vehicle rental facility, for example, needing to purchase or provide specific terminals.

In comparison with conventional identification of a mobile terminal to the vehicle, a security advantage can also be obtained, since the functionalities of the vehicle are triggered only if the terminal has the identification information output by the vehicle management system and transmits said identification information at least in part in the form of an identifier to the vehicle. Finally, control of the vehicle in order to trigger appropriate functionalities by the mobile terminal following reception of the identification information also requires no active operator control of the terminal and no interaction with the vehicle by the user, although they are optionally still possible.

Preferred embodiments of the control system and the developments thereof are described below, said developments each being able to be combined arbitrarily with one another and with the other aspects of the invention described below, unless this is expressly ruled out.

According to a first preferred embodiment, the control unit is moreover set up to predetermine the at least one vehicle functionality, at least inter alia, on the basis of the identification information. In particular, the identification information may contain the specification of which vehicle functionalities are intended to be enabled or else disabled for control by the mobile terminal or in what parameter ranges (e.g. volume range for an audible signal) a particular functionality can be operated, or indeed cannot, so that the control system can implement this as appropriate and hence allows selected control by the terminal. In this manner, it is particularly possible for control of the vehicle to be personalized, the user of the vehicle being able to be assigned appropriate personal identification information that can be transmitted to the control system, which identification information can differ from user to user. In addition, it is possible for further criteria, for example limitations on functionalities in respect of security aspects, in addition to the identification information, to form a basis for predetermination of the vehicle functionalities. Such further criteria may already be present in the control unit, for example in a memory.

According to a further preferred embodiment, the control system moreover has a locating apparatus that is set up to obtain a signal transmitted by a mobile terminal, and to use the signal to perform location of the mobile terminal in the local environment of the vehicle and to transmit a position of the terminal ascertained in the process to the control unit. In this case, the control unit is moreover set up to determine the at least one vehicle functionality, at least inter alia, on the basis of the position of the terminal ascertained during location. The locating can in this case be determined particularly on the basis of the signal strength of the received signal or the time profile of said signal strength. It is also possible for multiple antennas or receivers arranged at different locations to be used in order to establish propagation time differences and to infer distances and directions therefrom in order to deduce the at least approximate position of the terminal from the received signals. In this manner, the control unit also has the approximate position of the mobile terminal available, which can be used, inter alia, to make control of the vehicle functionalities also dependent on the absolute position or the relative position of the terminal in relation to the vehicle, and, by way of example, to trigger unlocking of a locking system of the vehicle only when the terminal is already in direct proximity to the vehicle.

In a preferred development of this embodiment, the locating apparatus is moreover set up to perform zone-based location of the terminal, which involves the position of the terminal being associated with a particular predetermined zone in the local environment of the vehicle. Such a locating system is described particularly in the aforementioned German patent application DE 10 2014 217 504.6. In this case, the control unit is moreover set up to determine the at least one vehicle functionality, at least inter alia, on the basis of the zone associated with the position of the terminal during location. In this manner, the vehicle functionalities to be controlled can also be selected and prioritized by the control unit depending on the identified zone in which the terminal is located or a chronological sequence of multiple such zones. In particular, this can be effected, in a first variant, such that when the terminal, and hence its user, approaches from an exterior environment of the vehicle into a direct near field of the vehicle (for example when an ascertained distance of the terminal from the vehicle is below a predefined threshold x), the doors of said vehicle are unlocked. In a further variant, the trunk can be deliberately unlocked when the terminal approaches the trunk of the vehicle from the exterior environment thereof. In yet a further variant, this can be effected such that when the terminal approaches the vehicle in a zone situated to the side thereof, only one or more doors on this side of the vehicle are unlocked, particularly only after the terminal has stayed there for a predetermined time. This particularly allows specific coordination of the functionalities of the vehicle that are to be controlled, in particular triggered, by the terminal to the needs of the user.

According to a further preferred embodiment, the at least one vehicle functionality comprises at least one of the following:
activation of at least one illuminant of the vehicle;
termination of the output, particularly transmission, of the first identifier;
unlocking of a locking system of the vehicle, optionally additionally with active opening of the vehicle closure secured with the locking system;
deactivation of an engine immobilizer of the vehicle;
output of an audible or visual signal;
activation of an infotainment installation, particularly of a car radio;
starting of an engine or of another actuator of the vehicle.

In particular, the vehicle functionalities can comprise what is known as a welcome presentation, which involves the at least one illuminant and/or an audible or visual signal being used by the vehicle, under the control of the control unit, to react to the approach of the mobile terminal in order to catch the attention of or to greet an approaching user. The vehicle closures secured with a locking system may be particularly doors, windows or trunk lids or doors of the vehicle. Other possible actuators of the vehicle are, inter alia, mechanisms for opening a top, for extending recessed headlights or for opening a sliding roof.

In this way, many and diverse options, including combinations of the aforementioned functionalities, can be made available, this being able to be used particularly for personalization, where vehicle functions for remote control or remote triggering can be selected by the mobile terminal of the user on a user-specific basis.

According to a further preferred embodiment, the identification information contains a cryptographic key and the control unit is moreover set up to act as a terminal station of a bidirectional communication link that runs via the second communication interface and is encrypted by means of the key, with the mobile terminal as a remote terminal station. In this manner, it is possible for a secure communication channel to be set up between the control system, particularly the control unit thereof, and the mobile terminal (pairing) and used in order to interchange information between the two parties in a secure manner. Hence, the security of the information transmission, particularly of information that can lead to the unlocking of locking installations of the vehicle or to deactivation of the engine immobilizer of the latter, can be increased by this secure channel and interception and possibly unauthorized use of information transmitted via the channel by unauthorized third parties can be hampered.

According to a first variant of this embodiment, the control unit is moreover set up to initiate setup of the encrypted communication link after it has obtained the second identifier via the second communication interface and the result of the check was that the second identifier corresponds to the first identifier according to the first predetermined rule. In this manner, the vehicle can use the control unit to take the initiative for setting up a secure communication channel to the terminal if, on the basis of an applicable result of the check, there is the certainty that the terminal has previously been authorized for the remote control or remote triggering of functionalities with the vehicle. Since the terminal has likewise obtained the key from the vehicle management system, it can act as a remote station for the encrypted channel and can communicate with the vehicle via the latter in secure fashion.

According to a second variant of this embodiment, the control unit is moreover set up:
to produce a random piece of information and to send it to the mobile terminal via the encrypted communication link,
to use the encrypted communication link to receive a third identifier from the mobile terminal, to check whether the third identifier corresponds to the random piece of information according to a second predetermined rule, and
only if this is also the case, to trigger or alter the at least one predetermined vehicle functionality by actuating one or more vehicle components associated with the at least one vehicle functionality via the at least one control interface as appropriate.

In this case, a piece of "random information" is intended to be understood to mean a piece of information, particularly a bit sequence or a signal, that is produced by the control unit artificially, particularly according to an algorithm, for example a known random algorithm. What is known as "pseudo-random information" in the technical terminology is also "random information" within the context of the invention. According to this variant, the certainty that the mobile terminal is actually a device authorized for the remote control or remote triggering of functionalities of the vehicle can be increased even further by cumulatively introducing a further check that needs to be passed before the vehicle functionalities can be triggered or altered.

In a third vaiant of this embodiment, which can be used as an alternative or in addition to one or more of the aforementioned variants, the control unit is moreover set up to use the encrypted communication link to receive a fourth identifier from the mobile terminal, and to send a fifth identifier, corresponding thereto according to a third predetermined rule, to the mobile terminal via the encrypted communication link. According to this variant, the additional security check described in this embodiment can be initiated by the mobile terminal, whereupon the control system reacts accordingly. In respect of said checks according to the second and third predetermined rules, the statements already made regarding the check according to the first predetermined rule apply accordingly. The applicable rules can be predetermined particularly by configuration or programming of the control unit or of the mobile terminal.

According to a further preferred embodiment, the control unit is moreover set up:
to use the at least one control interface to receive a sensor signal from at least one sensor of the vehicle;
to check whether the received sensor signal satisfies a predetermined criterion; and
only if this is also the case, to trigger or alter the at least one predetermined vehicle functionality by actuating one or more vehicle components associated with the at least one vehicle functionality via the at least one control interface as appropriate.

In this case, the sensor may particularly be a sensor that is provided and suitable for detecting an action, for example a movement by the user. This may particularly be a conventional interaction with the vehicle, such as grasping a door handle or a foot gesture in a spatial area beneath the trunk, for example. This allows security to be increased even further, and it is particularly possible to avoid (at least as yet) unintentional remote triggering, or remote triggering unnoticed by the user, of vehicle functionalities.

According to a further preferred embodiment, the control unit may moreover be set up to check whether a signal received from the mobile terminal indicates that the user has used the terminal to make a predetermined input or movement, and only if this is also the case, to trigger or alter the at least one predetermined vehicle functionality by actuating one or more vehicle components associated with the at least one vehicle functionality via the at least one control interface as appropriate. Hence, security with regard to correct authentication of an authorized terminal can be increased even further. This embodiment, in which a particular user activity takes place on the terminal rather than on the vehicle, can also increase security even further, and it is particularly possible to avoid (at least as yet) unintentional remote triggering, or remote triggering unnoticed by the user, of vehicle functionalities. This embodiment can also be used cumulatively with respect to the one described immediately above, although normally one of the two is sufficient to attain the advantages cited here.

A second aspect of the invention relates to a vehicle, particularly a motor vehicle, that has a control system according to the first aspect of the invention and also vehicle components for providing associated vehicle functionalities. In this case, the control system is connected to the vehicle components via its at least one control interface. In order to avoid repetition, reference is made to the preceding description relating to the first aspect of the invention, which is relevant in equal measure here.

A third aspect of the invention relates to a vehicle management system having at least one data processing unit and also a computer program having instructions that, when executed on the at least one data processing unit, prompt the latter to carry out the following steps:
electronic provision, via a communication network, of information that represents at least one option for the selection and management of a selected vehicle;
reception of management data transmitted via the communication network that represent a selection and management of a vehicle according to the at least one option and also an identity or network address of a mobile terminal;
production of identification information that contains a first identifier, a second identifier and a cryptographic key;
sending of the identification information to the vehicle identified by the management data and to the mobile terminal, in each case via an appropriate communication link.

In this case, "management" of the vehicle within the context of the invention may be particularly reservation of the vehicle for a user, as can be used for rental vehicles (including "car sharing"), for example. As such, a user can use the communication network, which may be the internet, in particular, to have a selection of vehicles displayed to him, for example via an appropriate web page, and to specify an applicable selection of a vehicle and also of one or more desired vehicle functionalities or settings that are intended to be remotely controlled or remotely triggered via a mobile terminal of the user and to transmit said selection to the vehicle management system. This can be accomplished particularly by appropriate inputs on said web page or by an appropriate electronic message to the vehicle management system. The latter then produces the identification information, which is transmitted both to the reserved vehicle and to the mobile terminal of the user, so that the identification method described above can be carried out between the vehicle or the control unit and the terminal. The vehicle functionalities can be used particularly to draw the attention of a user approaching the vehicle to the vehicle in order to easily find the latter, for example in a parking garage or a car park having a multiplicity of vehicles. Furthermore, allowing convenient vehicle access, without the need for manual interaction with the vehicle, by remotely triggered unlocking of the vehicle is also a preferred application of the invention.

A fourth aspect of the invention relates to a method for operating a mobile terminal that has one or more communication devices for wireless communication with a remote party and a user interface for capturing inputs from a user and for outputting information to the user. In this case, the method comprises the following steps:

output of information on the user interface, which information represents at least one option for the selection and management of a vehicle;

capture of a user input on the user interface for the selection and management of a vehicle corresponding to one of the options;

sending of data denoting the selection and management of the vehicle to a vehicle management system according to the third aspect of the invention via the communication device;

reception, via the communication device, of identification information that has been sent by the vehicle management system and contains a first identifier, a second identifier and a cryptographic key;

reception, by one of the communication devices, of the first identifier transmitted by the reserved vehicle; and transmission of the second identifier via one of the communication devices.

In this case, the first three cited steps are used for selecting a vehicle and managing it on the mobile terminal, said management particularly in terms of selection of desired vehicle functionalities, and transmission thereof to a vehicle management system according to the invention. The fourth step is used for receiving the information required for identification to the vehicle control system from the vehicle management system, and the last two steps are finally used to perform this identification in order to be able to remotely trigger or remotely control the desired vehicle functionalities on the basis thereof.

In a variant of the method, after the identification information has been received, transmission of the second identifier is triggered according to one of the following criteria or according to a combination thereof:

immediately or at a defined interval of time after the identification information has been received;

after the physical distance of the terminal from the selected vehicle drops below a predetermined threshold value (geofencing); or after the first identifier has been received on the terminal.

In this case, geofencing can, in particular, be effected preferably such that the mobile terminal has a locating functionality of its own, for example position finding by means of a satellite navigation system (GPS, Galileo, Glonass, etc.), in order to be able to establish its own position thereby, and that the position of the vehicle, which likewise has a position finding system, is transmitted from the latter to the vehicle management system from that on to the mobile terminal. Direct transmission of the vehicle position from the vehicle to the mobile terminal is also additionally or alternatively possible.

In this manner, the behavior of the mobile terminal can be configured variably, particularly such that energy is expended for transmitting the second identifier only when it has been recognized that there is an increased likelihood of there being a successful identification, particularly on the basis of the arrival within a physical distance of the vehicle or the successful reception of the first identifier. Since mobile terminals are normally battery operated, this can increase battery life and hence the period of availability of the mobile terminal without recharging.

Finally, a fifth aspect of the invention relates to a computer program for operating a mobile terminal, having instructions that, when executed on the mobile terminal, prompt it to carry out the method according to the fourth aspect of the invention. The computer program may be available particularly in the form of what is known as an application ("app") that can be loaded onto the mobile terminal particularly via the internet, for example from one of the known "app stores", such as "App Store" from the Apple company or "Google Play Store" from the Google company, for example. In this manner, users can use their personal mobile terminals in order to bring about personalized remote triggering or remote control of vehicle functionalities, particularly as part of a vehicle reservation, in conjunction, according to the invention, with the vehicle or the control system thereof and a vehicle management system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
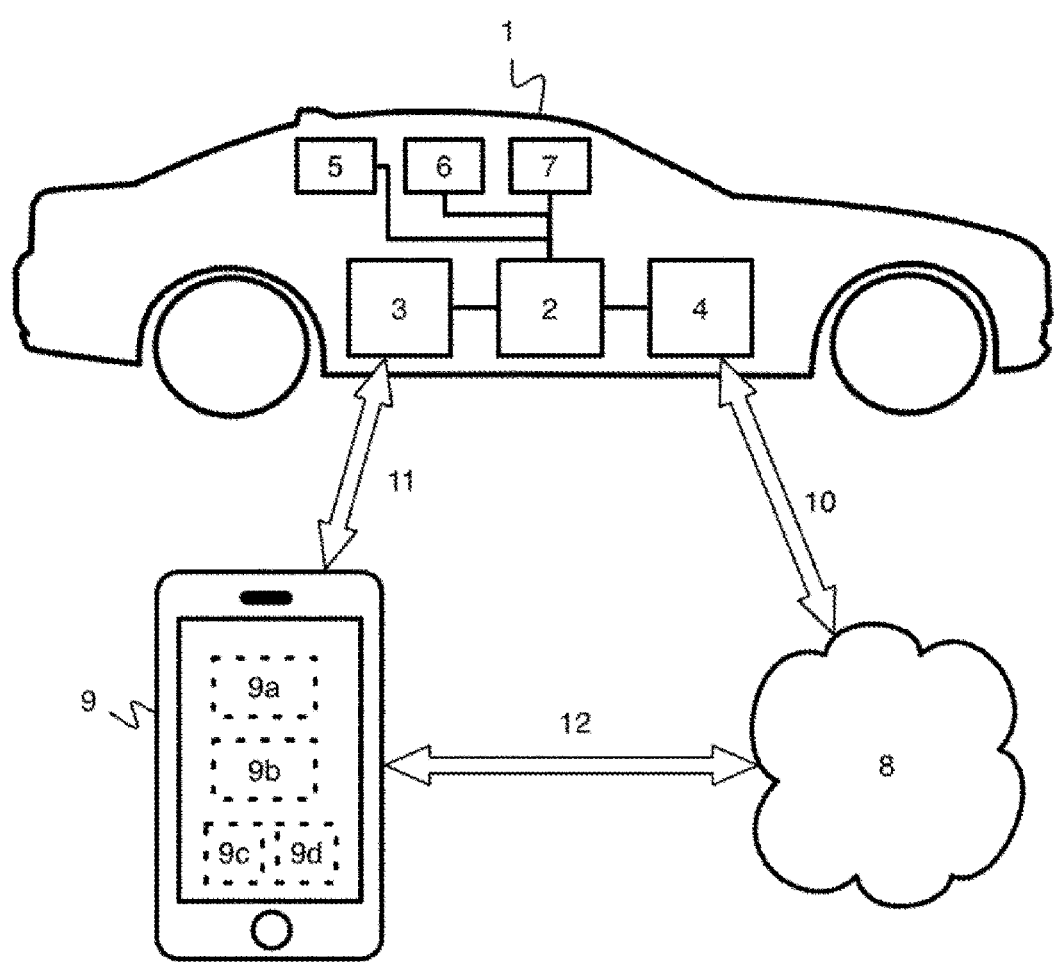
FIG. 1 schematically shows an overall system with a vehicle based on the second aspect of the invention with a control system based on the first aspect, a vehicle management system based on the third aspect, and a mobile terminal with a computer program based on the fifth aspect, each according to preferred embodiments of the invention.
Figure 2:
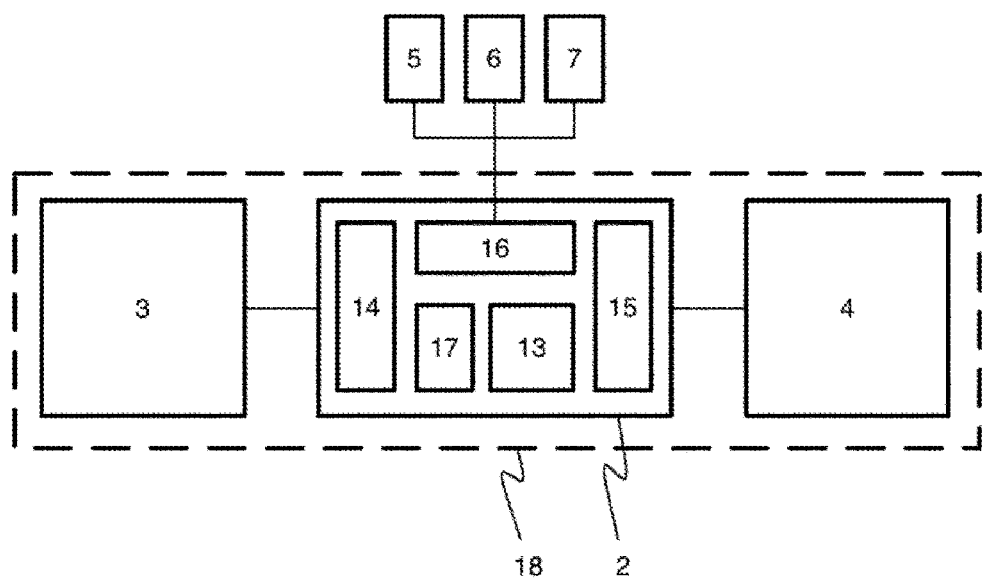
FIG. 2 schematically shows a control system based on the first aspect with communication apparatuses, according to a preferred embodiment of the invention.

First of all, reference is made to FIG. 1 and FIG. 2. FIG. 1 depicts a vehicle, to be more precise a motor vehicle 1, that contains a control system 2 according to the invention. As shown in FIG. 1 and, in greater detail, again in FIG. 2, said control system is in turn connected via two communication interfaces 14 and 15 to radio communication apparatuses 3 and 4. In this case, the radio communication apparatus 3 is designed for an effective radio range of no more than a few hundred meters by means of short-range radio engineering. It may be designed particularly according to a Bluetooth® standard or a WLAN standard for short-range radio connection to a mobile terminal, and in the case of Bluetooth®, it is advantageously also possible to use the "iBeacon" technology already mentioned above. The control system 2 furthermore has a locating apparatus 17 that can be used to evaluate the signals received from the terminal 9 by the communication apparatus 3 in order to be able to ascertain therefrom an at least coarse position of the terminal relative to the vehicle and forward it to the control unit 13, in order to take this as a basis for selecting vehicle functionalities for remote triggering or remote control that are possibly determined on the basis of position. A control interface 16 connects the control system 2 via a field bus, for example a CAN bus, to multiple vehicle subsystems 5 to 7. These vehicle subsystems include a position finding unit 5, which may be in the form of a GPS receiver, in particular, at least one sensor 6, which is designed to detect user actions on the vehicle or in the environment thereof and may be a motion sensor or a camera, for example, and also at least one vehicle component 7, the functionality of which is remotely triggerable or remotely controllable by a mobile terminal. The control system 2 moreover has a control unit 13 that is designed to use the control interface 16 to receive signals or data from the position finding unit 5 and the sensor 6, and to actuate the at least one vehicle component 7 to trigger or control the functionality thereof using appropriate signals. In a preferred embodiment, the communication apparatuses 3 and 4 may also be integrated together with the control system 2 in an extended control system or control module 18. The integration may particularly also have been effected on a semiconductor chip in the sense of a system on chip (SoC) or in a chipset comprising multiple interacting chips.

FIG. 1 moreover shows a vehicle management system 8, which may particularly be a computer system, for example a server or server cluster that is accessible via the internet as a communication network. The vehicle management system 8 has a communication apparatus that is used to allow a communication link 10 to the communication apparatus 4 of the vehicle 1. In this case, the communication link 10 can be provided particularly by means of mobile radio engineering (e.g. GSM, UMTS, LTE, 5G, etc.).

Moreover, FIG. 1 depicts a mobile terminal 9 that has a first communication device 9a for setting up a radio link 11 to the communication apparatus 3 of the vehicle 1 and a second communication device 9b for setting up a further communication link 12 to the vehicle management system 8. In some embodiments, the communication devices 9a and 9b may also be integrated together and hence form a unit, particularly in the sense of what is known as a "software-defined radio", in which the radio engineering to be used can be configured dynamically by software. In this case, the communication device 9a is designed such that it supports the same radio engineering as the communication apparatus 3 of the vehicle 1, that is to say Bluetooth® or WLAN, for example. The communication device 9b is designed for communication, particularly via the internet, with the remote vehicle management system 8 and may particularly be a mobile radio apparatus. Furthermore, the mobile terminal also has an application processor 9c and a program or data memory 9d, the latter storing a computer program (app) according to the fifth aspect of the invention for execution on the application processor 9c.

Figure 3:
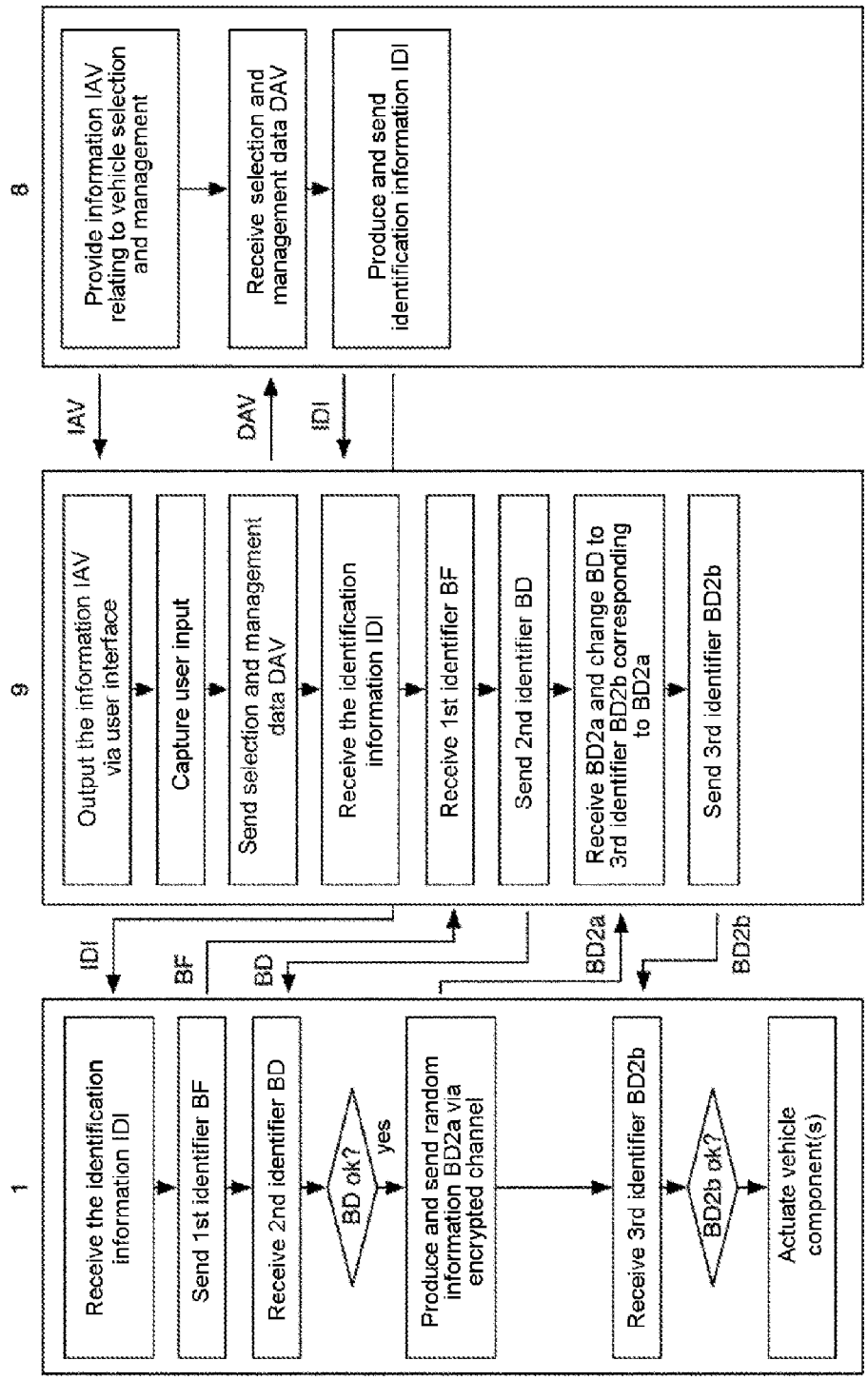
FIG. 3 shows a flowchart to illustrate a preferred embodiment of a method or computer program according to the invention based on the fourth or fifth aspect of the invention, shown in conjunction with the vehicle management system based on the third aspect and the control system or vehicle based on the first or second aspect of the invention.

Reference is subsequently made to FIG. 3 in order to explain an embodiment of the method according to the invention according to the fourth aspect of the invention and the interaction between the vehicle 1 or the control system 2 thereof, the vehicle management system 8 and the mobile terminal 9. First of all, the vehicle management system 8 makes information IAV concerning vehicle selection and management available electronically, for example via a web page on the internet. The mobile terminal 9 can be used to output this information IAV, particularly via an appropriate browser or preferably via a specific application according to the fifth aspect of the invention via a suitable user interface, particularly a touch-sensitive screen. The user can then use the same or a different user interface of the terminal 9 to make a user input, by which a vehicle can be selected and at least one management option, for example a reservation or a selection of vehicle functionalities that are intended to be triggered remotely later by the terminal 9, can be determined. The relevant selection and management data DAV are then sent from the terminal 9 to the vehicle management system 8 and received by the latter.

On the basis of these data DAV, the vehicle management system 8 produces identification information IDI that contain firstly a first identifier BF, a second identifier BD, a cryptographic key PSK and secondly information comprising the selection and management data DAV, particularly the selected vehicle functionalities. This identification information IDI is transmitted from the vehicle management system both to the terminal 9 and to the vehicle 1 or the control unit 2 thereof and received by each of these.

Subsequently, possibly after additional conditions such as an approach by the mobile terminal 9 to within a minimum distance of the vehicle 1, for example, have been established by the vehicle 1 or the control unit 2 thereof, the vehicle transmits the first identifier BF that the identification information IDI contains, particularly using a short-range radio technology such as Bluetooth® or WLAN. The terminal 9 receives the first identifier BF and reacts thereto by beginning to send the second identifier BD, which the identification information IDI likewise contains, particularly using the same radio technology as has already been used for sending the first identifier BF.

Following reception of the second identifier BD by the vehicle 1, a check is performed in the latter to determine whether the second identifier BD corresponds to the first identifier BF according to a first predetermined rule (preferred variants for such a correspondence or rule have already been described more precisely above connection with the first aspect of the invention). If this is the case, then the vehicle produces a piece of random information BD2a and transmits it in turn, particularly to the terminal 9. This is accomplished by using an encrypted communication channel, previously set up using the key PSK, for the terminal. The terminal 9 in turn reacts to the reception of the random information BD2a, which it can decrypt using the key PSK by now beginning to transmit a third identifier BD2b corresponding to BD2a, rather than the second identifier BD. This correspondence can consist particularly in BD2a and BD2b being identical. On the vehicle, the third identifier BD2b is then received and checked for correspondence, or particularly a match with the random information BD2a. If this check confirms the correspondence, then the control unit 2 of the vehicle uses the control interface 16 to actuate the relevant vehicle components 7 such that the vehicle functionalities selected in the identification information are triggered or appropriately altered. This may be particularly the triggering of a light show, of audible signals or the opening of doors or of a trunk lid. It is also conceivable for lighting that already exists to be altered.

While at least one embodiment has been described above, it should be noted that a large number of variations exist in this regard. It should also be noted in this context that the embodiments described are only nonlimiting examples, and there is no intention to limit the scope, applicability or configuration of the apparatuses and methods described here thereby. Rather, the description above will provide a person skilled in the art with instructions for implementing at least one embodiment, and it goes without saying that various changes can be made to the manner of operation and the arrangement of the elements described in an embodiment without, in so doing, departing from the subject matter defined in each of the appended claims or the legal equivalents of said subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Vehicle
2 Control system
3, 4 Radio communication apparatuses of the vehicle
5 Position finding unit
6 Sensor
7 Vehicle component(s)
8 Vehicle management system
9 Mobile terminal
9a, 9b Communication apparatuses of the terminal
9c Application processor
9d Program or data memory
10 Communication link
11 Radio link
12 Further communication link
13 Control unit
14, 15 Communication interfaces
16 Control interface
17 Locating apparatus for locating the terminal
18 Control module
IAV Information concerning vehicle selection and management
DAV Selection and management data
IDI Identification information
BF First identifier
BD Second identifier
BD2a Random information
BD2b Third identifier
PSK Cryptographic key

What is claimed is:
1. A control system for a vehicle, comprising:
a control unit;
a first communication interface configured to communicate via a first communication link to a remote vehicle management system;
a second communication interface configured to communicate via a second communication link to a mobile terminal; and
at least one control interface configured to control actuation of at least one vehicle component to trigger or alter at least one predetermined vehicle functionality;
wherein
the control unit is configured to
obtain identification information (DI) from the vehicle management system via the first communication interface,
output a first identifier incorporating the identification information via the second communication interface,
obtain a second identifier from a mobile terminal via the second communication interface;
determine whether the second identifier corresponds to the first identifier according to a first predetermined rule; and
control the at least one control interface to actuate at least one of the at least one vehicle components if the second identifier corresponds to the first identifier according to the first predetermined rule,
the identification information includes a cryptographic key,
the second communication link is a bidirectional communication link,
the control unit is configured to act as a terminal station of the bidirectional communication link via the second communication interface,
the mobile terminal is configured to act as a remote terminal station of the bidirectional communication link, and
the bidirectional communication link is encrypted using the cryptographic key from included in the identification information.

2. The control system as claimed in claim 1, wherein the control unit is configured to determine the at least one predetermined vehicle functionality on the basis of the identification information.

3. The control system as claimed in claim 1, wherein the at least one predetermined vehicle functionality includes at least one of
activation of at least one illuminant of the vehicle,
termination of the output of the first identifier,
unlocking of a locking system of the vehicle,
deactivation of an engine immobilizer of the vehicle,
output of an audible or visual signal, and
starting of an engine or of another actuator of the vehicle.

4. The control system as claimed in claim 3, wherein the unlocking of a locking system of the vehicle includes active opening of a vehicle closure secured with the locking system.

5. The control system as claimed in claim 1, wherein the control unit is configured to initiate setup of the encrypted bidirectional communication link after obtaining the second identifier via the second communication interface and determining the second identifier corresponds to the first identifier according to a first predetermined rule.

6. The control system as claimed in claim 5, wherein the control unit is configured to
to generate a random piece of information,
transmit the random piece of information to the mobile terminal via the encrypted communication link,
receive via the encrypted communication link a third identifier from the mobile terminal;

determine whether the third identifier corresponds to the random piece of information according to a second predetermined rule; and control the at least one control interface to actuate at least one of the at least one vehicle components if the third identifier corresponds to the random piece of information according to the second predetermined rule.

7. The control system as claimed in claim 6, wherein the control unit is configured to receive via the encrypted bidirectional communication link a fourth identifier from the mobile terminal; and transmit via the encrypted bidirectional communication link a fifth identifier corresponding to the fourth identifier according to a third predetermined rule to the mobile terminal.

8. The control system as claimed in claim 1, wherein the control unit is configured to receive via the at least one control interface a sensor signal from at least one sensor of the vehicle, determine whether the received sensor signal satisfies a predetermined criterion, and control the at least one control interface to actuate at least one of the at least one vehicle components if the received sensor signal satisfies the predetermined criterion.

9. A vehicle, comprising:

the control system as claimed in claim 1; and the at least one vehicle component configured to provide the at least one predetermined vehicle functionality, wherein the control system controls the at least one vehicle component to trigger or alter the at least one predetermined vehicle functionality via the at least one control interface.

10. A control system for a vehicle, comprising:

a control unit;

a first communication interface configured to communicate via a first communication link to a remote vehicle management system;

a second communication interface configured to communicate via a second communication link to a mobile terminal;

at least one control interface configured to control actuation of at least one vehicle component to trigger or alter at least one predetermined vehicle functionality; and a locating apparatus, wherein the control unit is configured to obtain identification information (IDI) from the vehicle management system via the first communication interface, output a first identifier incorporating the identification information via the second communication interface, obtain a second identifier from a mobile terminal via the second communication interface, determine whether the second identifier corresponds to the first identifier according to a first predetermined rule, and control the at least one control interface to actuate at least one of the at least one vehicle components if the second identifier corresponds to the first identifier according to the first predetermined rule, the locating apparatus is configured to obtain a signal transmitted by the mobile terminal, use the signal to identify a location of the mobile terminal in a local environment of the vehicle, and transmit the location of the mobile terminal to the control unit, and the control unit is configured to determine the at least one predetermined vehicle functionality on the basis of the position of the mobile terminal ascertained by the locating apparatus.

11. The control system as claimed in claim 10, wherein the locating apparatus is configured to determine the location of the mobile terminal in a zone-based manner in which the position of the mobile terminal is associated with a zone in the local environment of the vehicle, and the control unit is configured to determine the at least one predetermined vehicle functionality on the basis of the zone associated with the position of the mobile terminal.

12. A vehicle management system, comprising:

at least one data processing unit having a computer program configured to electronically provision, via a communication network, information that represents at least one option for the selection and management of a selected vehicle;

receive management data transmitted via the communication network that represent a selection and management of a vehicle according to the at least one option and also an identity or network address of a mobile terminal;

produce identification information that contains a first identifier, a second identifier and a cryptographic key;

send the identification information to the vehicle identified by the management data and to the mobile terminal, in each case via an appropriate communication link, wherein the identification information enables the vehicle to verify a request from the mobile terminal for triggering or altering at least one predetermined vehicle functionality.

13. A method for operating a mobile terminal that has at least one communication device for wireless communication with a remote party and a user interface configured to capture inputs from a user and to output information to the user, comprising the acts of:

outputting to the user interface information representing at least one option for selection and management of a vehicle;

capturing a user input on the user interface corresponding to one of the options for selection and management of the vehicle;

transmitting from the at least one communication device of the mobile terminal data denoting the captured user input to a remote vehicle management system;

receiving via the at least one communication device identification information from the vehicle management system containing a first identifier, a second identifier and a cryptographic key;

receiving from a reserved vehicle via the at least one communication device the first identifier; and transmitting via the at least one communication device the second identifier from the mobile terminal to the reserved vehicle.

14. The method as claimed in claim 13, wherein the act of transmitting the second identifier from the mobile terminal to the reserved vehicle is triggered by at least one of immediately or at a defined interval of time receipt by the mobile terminal of the identification information, after a physical distance of the mobile terminal from the reserved vehicle being below a predetermined threshold distance; and after receipt of the first identifier by the mobile terminal.

15. A computer program fixed in a tangible medium configured to control execution on a mobile terminal of the method as claimed in claim 13.

* * * * *